United States Patent [19]

Mehta

[11] Patent Number: 4,880,675

[45] Date of Patent: Nov. 14, 1989

[54] HOT-FILLABLE PLASTIC CONTAINERS

[75] Inventor: Rajendra K. Mehta, Hampton, N.J.

[73] Assignee: Air Products and Chemicals, Inc., Allentown, Pa.

[21] Appl. No.: 185,715

[22] Filed: Apr. 25, 1988

[51] Int. Cl.$^4$ .................... B65D 23/00; B29C 71/00; B32B 27/00

[52] U.S. Cl. ................................. 428/35.7; 215/1 C; 215/12.2; 264/83; 427/230; 427/236; 428/215; 428/421; 428/476.1; 428/516; 428/518; 428/520

[58] Field of Search ........ 215/1 C,12.2; 428/35, 421, 428/516, 213, 215, 475.8, 476.1, 518, 520, 35.7; 156/244.14; 264/83, 259, 513-516; 427/230, 236

[56] References Cited

U.S. PATENT DOCUMENTS

| | | | |
|---|---|---|---|
| 2,811,468 | 10/1957 | Joffre | 117/95 |
| 3,647,613 | 3/1972 | Scotland | 428/421 |
| 3,862,284 | 1/1975 | Dixon et al. | 264/83 |
| 4,550,043 | 10/1985 | Beck | 428/36 |
| 4,610,366 | 9/1986 | Estes et al. | 215/31 |
| 4,617,077 | 10/1986 | Giese et al. | 264/83 |
| 4,764,405 | 8/1988 | Bauman et al. | 428/421 |

*Primary Examiner*—Ellis P. Robinson
*Assistant Examiner*—James J. Seidleck
*Attorney, Agent, or Firm*—Mark L. Rodgers; William F. Marsh; James C. Simmons

[57] ABSTRACT

The present invention is an improved plastic container having both improved thermal resistance and improved aroma and flavor barrier properties. The container comprises a polyethylene inner layer having a thickness in the range of 0.5 to 10.0 mil, and a coextruded polypropylene outer layer having a thickness such that the ratio of polypropylene to polyethylene is at least 2:1, and wherein the surface of the polyethylene layer has been treated with a reactive source of fluorine.

20 Claims, No Drawings

HOT-FILLABLE PLASTIC CONTAINERS

TECHNICAL FIELD

The present invention relates to plastic containers having good barrier properties and temperature resistance, and processes for making the same.

BACKGROUND OF THE INVENTION

Preventing scalping of flavor or aroma components into the walls of plastic containers is a matter growing concern in the packaging industry. Flavor and aroma components, mostly volatile organics, are typically present at parts per million or even at parts per billion levels. Most common plastics, such as polyethylene, polypropylene, polystyrene, etc., tend to absorb, entirely or selectively, such volatile organics thereby either distorting or depriving the product of its intended taste and aroma.

One method of solving this problem has been by modifying the surface of polyethylene using fluorination. A number of flavor-sensitive products, however, such as juices, are "hot-filled" or filled at temperatures far above the softening and distortion points for polyethylene, thereby making such containers unsuitable for these uses.

Using polypropylene for such containers is an attractive alternative from cost, strength, and temperature resistance standpoints; however, like polyethylene, polypropylene also vigorously scalps flavor and aroma components from packaged goods, especially food products. Fluorinating polypropylene containers has proven to be significantly less successful in preventing the scalping of flavor/aroma components, therefore also making such containers undesirable for many applications.

Joffre, U.S. Pat. No. 2,811,468 teaches a method of imparting barrier properties to polyethylene films by fluorinating at least one surface of said film to contain not more than about 3.5% by weight fluorine, and enough fluorine such that the surface shows reduced permeability to the passage of atmospheric gases there through.

Dixon, et al. U.S. Pat. No. 3,862,284 teaches a process for improving the barrier properties of thermoplastic hollow blow-molded articles, by mixing into the blowing gas about 0.1% to 10% by volume fluorine, with the balance of the blowing gas typically being inerts. Additionally, it is also disclosed that the addition of a variety of other reactive gases such as sulfur dioxide, carbon monoxide, carbon dioxide, oxygen, chlorine, bromine, etc. can also enhance the physical properties of the container.

Beck, U.S. Pat. No. 4,550,043 discloses preforms for use in blow molding containers which are suitable for use in conjunction with hot products which must be subjected to pasteurization. The preform comprises inner and outer first layers of a thermoplastic resin, inner and outer layers of a barrier material next to and between said inner and outer first layers and a second layer of thermoplastic resin between said barrier material layers; wherein said second layer of thermoplastic material has a high thermal stability.

BRIEF SUMMARY OF THE INVENTION

The present invention is an improved plastic container and a method of forming such a container by coextruding a multilayer plastic parison or sheets.

The container comprises a polyethylene (PE) inner layer having a thickness in the range of 0.5 to 10.0 mil., and a coextruded polypropylene (PP) outer layer having a thickness such that the ratio of polypropylene to polyethylene thickness is at least 2:1, and wherein the surface of the polyethylene layer which forms the interior of the container has been surface treated with a reactive source of fluorine.

The container, comprising a coextruded polyethylene interior and polypropylene exterior, is formed by coextruding thermoplastic PP/PE followed by blow-molding, injection molding, thermoforming and the like, into the desired shape. The surface of the PE layer which forms the interior of the container is treated with a reactive source of fluorine, either during the molding process or after the container is formed. The reactive source of fluorine can be any suitable source, such as fluorine containing liquid or plasma, but is preferably a gas stream containing between 0.1% to 10% $F_2$.

The resultant containers have high thermal resistance, and also high flavor and aroma barrier properties.

DETAILED DESCRIPTION OF THE INVENTION

The present invention is a container having both improved thermal resistance and improved flavor and aroma barrier properties. The container comprises a polyethylene inner layer having a thickness in the range of 0.5–10.0 mil, and coextruded polypropylene outer layer having a thickness such that the ratio of polypropylene to polyethylene thickness is at least 2:1. Although the extrudate and a significant portion of the resultant container have a polypropylene/polyethylene thickness ratio of at least 2:1, due to varied flow rates of the two polymers, the resultant container may have areas wherein the ratio drops below this level. The polyethylene inner layer which forms the interior of the container has been surface treated with a reactive source of fluorine. The interior fluorinated polyethylene layer imparts the container with good flavor/aroma barrier properties while the polypropylene outer layer acts as the structural layer, providing the necessary thermal resistance to prevent deformation of the container at hot-fill temperatures; typically around 180°–205° F. The polypropylene outer layer includes homopolymers and/or copolymers of polypropylene.

The containers of the present invention exhibit properties which cannot be achieved by using polyethylene or polypropylene alone, since polyethylene cannot withstand "hot-fill" temperatures, and polypropylene, even when fluorinated, was found not to provide good barrier properties. Reversing the layers such that the polypropylene is the interior layer with the treated polyethylene the outer layer is ineffective since flavor and aroma components are lost due to migration into the polypropylene. It has been found that only containers having the structure as set out in the present invention are suitable for "hot-fill" applications when flavor and/or aroma preservation are important. Surprisingly, when each layer is within the thickness ranges set out above, the interior polyethylene layer will not deform or delaminate from the polypropylene layer, even when subjected to "hot-fill" temperatures well above the softening and distortion point of polyethylene. If the thickness of either layer is outside of the above prescribed limits there is a good chance of delamination between the layers or deformation of the container.

In an optional embodiment of the present invention, a tie layer, such as a copolymer of maleic anhydride with ethylene vinylacetate (EVA), polypropylene, polyethylene, etc., may be present between the polypropylene outer layer and the polyethylene inner layer to enhance the adhesion between the two layers. In addition to such a tie layer, an oxygen barrier layer may be coextruded between the polypropylene and polyethylene layers. Examples of such possible oxygen barrier layers included: polyethylene vinyl alcohol, polyvinylidine chloride, nylons, and the like.

The surface of the interior polyethylene layer which forms the interior of the container is fluorinated to a sufficient degree to impart flavor and aroma barrier properties. The extent to which such a surface must be fluorinated will depend upon the processing variables such as temperature, pressure, fluorine concentration in the treatment medium, etc.

The containers of the present invention are formed by molding a thermoplastic multilayer extrudate comprising a polyethylene inner layer and a polypropylene outer layer having thickness as set out above. The multilayer extrudate can be molded into containers by a variety of methods, such as by blow molding, thermoforming, injection molding, or any other suitable method. The inner polyethylene layer forms the interior of the container, and the polypropylene layer forms the exterior wall of the container. The surface of the polyethylene layer which forms the interior of the container is treated with a reactive source of fluorine to impart flavor and aroma barrier properties. The polyethylene surface can be treated during the molding process, or may be post-treated after the container is formed. Any suitable reactive source of fluorine can be used, including fluorine-containing plasmas, fluorine-containing gas streams, fluorine dissolved in various solvents, fluorine activated with UV radiation, and the like. In most embodiments it is preferred to use a fluorine-containing gas stream, and in the case where the containers are formed by blow molding, employing the fluorine stream directly as the blowing gas is preferred. The fluorine-contaning gas stream may also contain other active components such as $O_2$, $Cl_2$, $Br_2$, $SO_2$, $SO_3$, etc., or may consist of only $F_2$ and inerts such as $N_2$, Ar, or $CO_2$. In practice a treatment stream comprising between 0.1%–10% by volume $F_2$ with the balance $N_2$ has been proven to work well.

Optionally, the mutlilayer extrudate may have a tie layer positioned between the polypropylene and polyethylene layers to enhance adhesion of the layers. Additionally, one or more other layers, such as an oxygen barrier layer may be incorporated into the multilayer extrudate, with the only requirement being that such layers do not have a significant detrimental effect on the desired properties of the resultant container.

After the container is formed, any number of other treatments or additions can be performed, such as applying oxygen barrier coating to either the interior or exterior of the container or both.

The following examples are presented to further illustrate the present invention and are not meant to be limiting.

EXPERIMENTAL

The tests described in the examples below were carried out on various 16-oz round blow-molded containers. The compositions of the various containers were as follows:

(a) untreated high density polyethylene (control HDPE)

(b) untreated polypropylene (control PP)

(c) fluorinated HDPE; fluorinated PP (both fluorinated with 1% $F_2$, balance $N_2$ blend during blow molding)

(d) coextruded container with internal HDPE layer and external PP layer (Coex PE/PP), either fluorinated or untreated.

EXAMPLE 1

Samples of each of the containers described above (except fluorinated Coex PE/PP) were filled with boiling water at (100° C.) and capped. Both the untreated and fluorinated HDPE containers paneled (deformed) readily, whereas the untreated PP, fluorinated PP and Coex PE/PP containers showed no deformation. These results are summarized in Table 1 below.

TABLE 1

| Container | Condition |
| --- | --- |
| Control HDPE | Severely deformed |
| Fluorinated HDPE | Severely deformed |
| Control PP | No deformation |
| Fluorinated PP | No deformation |
| Coextruded HDPE-PP | No deformation |

The results above demonstrate that, while both fluorinated and unfluorinated HDPE container severely deform under high temperatures, the coextruded containers with HDPE inner and PP outer layers easily sustained hot-fill temperatures.

EXAMPLE 2

Samples of each of the containers described above were filled with toluene and stored in an oven at 50° C. for 4 weeks. Weight losses for the containers were measured after the 4 week storage period and are reported in Table 2 below.

TABLE 2

| Bottle | % wt. Loss (4 wks. @ 50° C.) |
| --- | --- |
| Control HDPE | 19.4 |
| Fluorinated HDPE | 0.4 |
| Control PP | 99.8 |
| Fluorinated PP | 85.1 |
| Int. Fluorinated Coex PE/PP | 0.2 |

The results reported in Table 2 above clearly show that the internal fluorinated Coex PE/PP container exhibits excellent barrier properties for organics such as toluene, even under elevated temperatures.

EXAMPLE 3

Runs were carried out to determine the flavor barrier properties and thermal resistance of samples of the above containers, compared to the properties which are generally known for conventional glass containers. Several of the containers described above were filled with hot (about 82° C.) aqueous solution containing 0.1% methanol and 100 ppm limonene, and were allowed to cool to room temperature. The methanol was used as a cosolvent for limonene; the latter being an important flavor ingredient in a variety of juices, especially orange juice. Samples of the aqueous solution were taken from the containers shortly after they were filled and also after a 4 week period. The results are reported in Table 3 below.

TABLE 3

| Container | Container Condition After 15 mins. | Limonene Concentration (ppm) After 4 weeks |
|---|---|---|
| Glass | (visually unchanged) | N.C.[1] |
| HDPE control | (severely deformed) | 0 |
| HDPE Fluorinated | (quite deformed) | High[2] |
| Fluorinated PP | (no deformation) | Low[2] |
| Fluorinated HDPE/ PP Coex | (no deformation) | N.C.[1] |

[1]N.C. = No Significant Change. Data was not actually obtained for these runs, however it is well known that conventional glass containers are well suited for this type of application, and previous testing also proved the thermal resistance and barrier properties of the Coex HDPE/PP container.
[2]Analytical method did not give a precise measurement, although relative concentrations could be measured.

The results above indicate the fluorinated Coex PE/PP container would be expected to retain its structure under the hot-fill conditions, and also exhibit excellent flavor barrier properties, even over a 4 week period, while all the other plastic containers tested proved unsuitable for this type of application. Consequently, of the samples listed above, only the fluorinated Coex PE/PP container would to be a suitable substitute for conventional glass containers.

Having thus described the present invention, what is now deemed appropriate for Letters Patent is set out in the following appended claims.

What is claimed is:

1. A coextruded container having both improved thermal resistance and improved flavor and aroma barrier properties comprising: a polyethylene inner layer having a thickness in the range of 0.5-10.0 mil which forms the interior surface of the container, and a polypropylene outer layer which forms the exterior surface of the container, said polypropylene layer having a thickness such that the ratio of polypropylene to polyethylene thickness is at least 2:1, and wherein said polyethylene layer which forms the interior surface of the container has been treated with a reactive source of fluorine.

2. A container in accordance with claim 1 wherein a tie layer is present between the polypropylene and polyethylene layer to enhance adhesion between the two layers 3. A container in accordance with claim 1 which comprises an oxygen barrier layer between the polypropylene and polyethylene layers.

4. A container in accordance with claim 3 wherein said oxygen barrier layer is selected from the group consisting of ethylene vinyl alcohol, polyvinylidine chloride, nylon, and mixtures thereof.

5. A container in accordance with claim 1 wherein a tie layer in combination with an oxygen barrier layer is positioned between the polyethylene and polypropylene layers.

6. A container in accordance with claim 1 further comprises a tie layer in combination with an oxygen barrier layer is located on the surface of the polypropylene layer which forms the exterior of the container.

7. A container in accordance with claim 1 wherein said container was blow molded from a polypropylene/polyethylene multilayer extrudate preform.

8. A container in accordance with claim 1 wherein said container was formed by a thermoforming or injection-molding process.

9. A container in accordance with claim 1 which has been coated with an oxygen barrier coating.

10. A container in accordance with claim 1 in which the exterior surface can be hot-filled with liquids at temperatures up to 205° F. without deforming.

11. A container in accordance with claim 1 wherein the interior surface has been treated with a reactive source of gaseous fluorine comprising between 0.1%-10% by volume $F_2$ with the balance $N_2$.

12. In a process for forming a container by molding a thermoplastic material, the improvement for increasing the thermal resistance and flavor and aroma barrier properties, which comprises: molding said container using a coextruded thermoplastic multilayer material comprising a polyethylene inner layer having a thickness in the range of 0.5-10.0 mil and a polypropylene outer layer having a thickness such that the ratio of polypropylene to polyethylene thickness is at least 2:1, such that the polyethylene layer forms the interior wall of the container, and surface treating the interior polyethylene layer with a reactive source of fluorine.

13. A process in accordance with claim 12 wherein said thermoplastic multilayer material has a tie layer positioned between the polypropylene and polyethylene layers to enhance adhesion between the layers.

14. A process in accordance with claim 12 wherein said thermoplastic multilayer material has an oxygen barrier layer between the polypropylene and polyethylene layers.

15. A process in accordance with claim 14 wherein said oxygen barrier layer is selected from the group consisting of polyethylene vinyl alcohol, polyvinylidine chloride, nylons, and mixtures thereof.

16. A process in accordance with claim 12 wherein said container is formed by blow molding said coextruded thermoplastic multilayer material.

17. A process in accordance with claim 16 wherein said interior surface of the polyethylene layer is treated with a reactive source of fluorine during the blow molding process by using a fluorine-containing gas stream as the blowing gas.

18. A process in accordance with claim 17 wherein said fluorine containing gas stream comprises between 0.1% to 10% by volume elemental fluorine, with the balance inerts.

19. A process in accordance with claim 12 wherein said container is formed by a thermoforming or injection-molding process.

20. A process in accordance with claim 12 wherein said interior polyethylene layer is post-treated with a reactive source of fluorine.

* * * * *

UNITED STATES PATENT AND TRADEMARK OFFICE
CERTIFICATE OF CORRECTION

PATENT NO.   :   4,880,675

DATED        :   November 14, 1989

INVENTOR(S)  :   Rajendra K. Mehta

It is certified that error appears in the above-identified patent and that said Letters Patent is hereby corrected as shown below:

Column 6, Line 11
    After "1", insert -- in --

Column 6, Line 11
    After "which", insert -- the exterior surface --

Column 6, Line 13
    After "1", delete "in"

Column 6, Line 13
    Delete "the exterior surface"

Signed and Sealed this

Tenth Day of September, 1991

Attest:

HARRY F. MANBECK, JR.

Attesting Officer

Commissioner of Patents and Trademarks